(12) United States Patent
Schmitt

(10) Patent No.: US 6,257,810 B1
(45) Date of Patent: *Jul. 10, 2001

(54) MILLING TOOL FOR THREAD-MILLING AND BORING OF HIGH-STRENGTH WORKPIECES

(76) Inventor: M. Norbert Schmitt, Schwalbenweg 3, D-90537 Feucht (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,374
(22) Filed: Aug. 19, 1998

(30) Foreign Application Priority Data

Sep. 9, 1997 (DE) .............................. 197 39 370

(51) Int. Cl.[7] ................ B23C 3/00; B23G 1/32
(52) U.S. Cl. ............................. 409/66; 409/74
(58) Field of Search ................ 409/74, 132, 66, 409/67, 68; 408/222, 144; 470/51

(56) References Cited

U.S. PATENT DOCUMENTS

| | | | |
|---|---|---|---|
| 4,755,399 | * | 7/1988 | Fujii et al. ................... 408/144 X |
| 4,761,844 | * | 8/1988 | Turchan ........................ 409/74 X |
| 4,831,674 | * | 5/1989 | Bergström et al. ............ 409/74 X |
| 4,930,949 | * | 6/1990 | Giessler ........................ 409/74 X |
| 4,943,191 | * | 7/1990 | Schmitt ......................... 409/74 X |
| 5,429,459 | * | 7/1995 | Palm ................................ 409/66 |
| 5,542,177 | * | 8/1996 | Hillestad .................... 409/132 X |
| 6,012,882 | * | 1/2000 | Turchan ............................ 409/74 |

FOREIGN PATENT DOCUMENTS 8803565   10/1988 (DE) .

* cited by examiner

Primary Examiner—William Briggs
(74) Attorney, Agent, or Firm—Jacobson Holman, PLLC

(57) ABSTRACT

A milling tool for thread-milling and boring has a milling region with thread-milling cutters disposed on thread-milling teeth, and bore-milling cutters disposed on an end face. The tool regions where the milling cutters are disposed are made of hard materials. The thread-milling cutters have a rake angle. The tool is successfully used to mill high-strength materials. The rake angle of the thread-milling cutters is zero or negative, and a coating of hard material is present in the region of the milling cutters. The combination of features including the use of hard material in the cutting region of the tool, the provision of a coating of hard material in the cutting region, and a zero or negative rake angle, enables use of the milling tool for thread-milling and boring with high-strength workpieces without problems and without experiencing high wear.

7 Claims, 1 Drawing Sheet

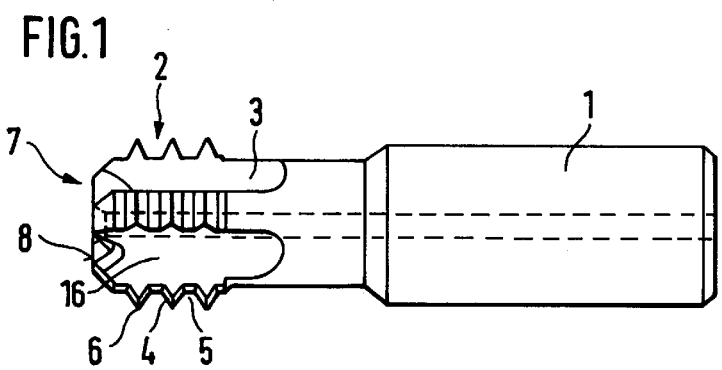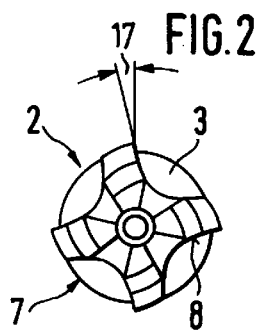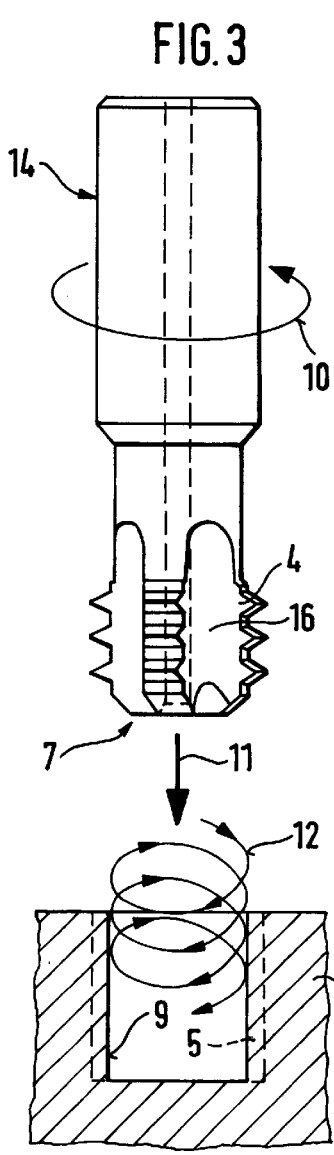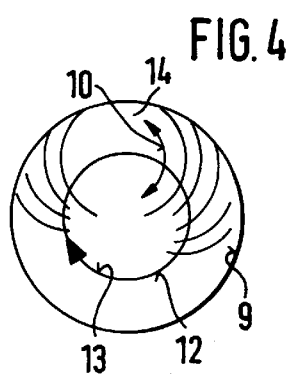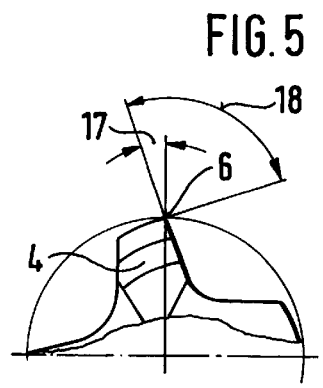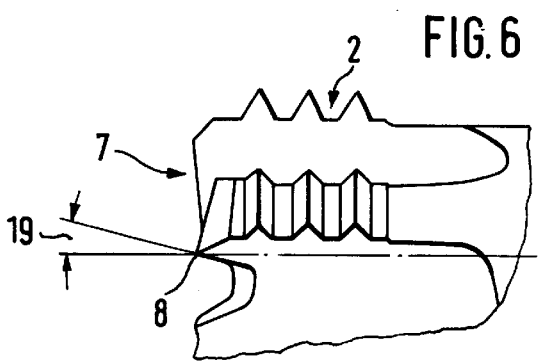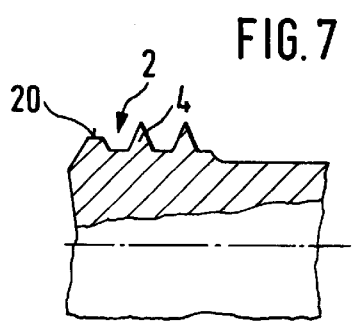

MILLING TOOL FOR THREAD-MILLING AND BORING OF HIGH-STRENGTH WORKPIECES

FIELD OF THE INVENTION

The invention relates to a milling tool for thread-milling and boring of high-strength materials. The tool includes a holding shaft and a lateral cutting region with cutters for milling threads into a workpiece. The cutters are disposed on thread-milling teeth on the lateral periphery of the tool, which teeth are not configured with a pitch, and a front face region in which bore-milling cutters are disposed. The regions of the tool forming the cutters are comprised of hard material, and the thread-milling cutters each have a rake angle.

BACKGROUND OF THE INVENTION

In a known milling tool for thread-milling and boring of this type as exemplified by Ger. Gbm. 88 03 565, the configuration of the rake angle and the configuration of the tool surface are not specified. The tool is intended for the machining of aluminum workpieces. Hard tool materials are used if the tool is to be operated at high cutting speeds. The hard materials are deemed to be, e.g., high-strength materials, such as certain high-strength steels, having as a rule a Rockwell hardness of at least 40, and typically 56–58.

SUMMARY OF THE INVENTION

It is an underlying problem of the present invention to devise a milling tool for thread-milling and boring of the type described initially supra, wherewith even high-strength workpieces can be machined successfully. The inventive milling tool for thread-milling and boring which solves this problem is characterized in that the rake angle of the thread-milling cutters is zero or negative, and in that a coating of hard material is present in the region of the milling cutters.

The combination of features consisting of the use of hard material in the cutting region of the tool, the provision of a coating of hard material in the cutting region, and a zero or negative rake angle, enables use of the milling tool for thread-milling and boring with high-strength workpieces without problems and without experiencing high wear. The rotational speed employed for the tool, and the lateral advance speed used for moving the milling tool translationally in a circular path, are similar to the speeds used customarily in machining of soft materials such as aluminum. The hard material in the region of the cutters is a sintered material.

The cutting tool may be used in a customary counter-machining arrangement wherein the tool is moved in a circular translational path which is counter to the direction in which the tool is rotated around the tool axis; however under these circumstances the cutting tool will experience appreciably more wear.

According to the invention the hard material in the region of the milling cutters, and the hard material of the coating of the milling cutters, for a milling tool for thread-milling and boring, are features which are combined with the feature that the thread-milling cutters have a zero or negative rake angle.

In tools with a positive rake angle, the cutting angle is smaller; however, the cuttings are lifted in the process of cutting. When a negative rake angle is used, the cutting angle is greater, but the material of the cuttings is forced out of the way.

The cutting regions of the milling tool which are comprised of hard material may be comprised of, e.g., cutting plates. However, as a rule the milling tool for thread-milling and boring is of a unitary construction, entirely comprised of hard material. The grooves to accommodate cuttings are present at least in the cutting region; they may have a shape which is, e.g., straight or spiral.

As a rule the sintered material is a hard metal having Vickers hardness (HV) at least 1700. As a rule the hard material coating is an anti-wear coating produced by PVD (physical vapor deposition) or CVD (chemical vapor deposition). The material may be, e.g., titanium nitrite or titanium carbonitrite. The hard material coating may be, e.g., single-layered or multilayered. As a rule the coating has a surface hardness at least 3000 HV.

It is particularly advantageous if the rake angle of the thread-milling cutters is in the range 0 to minus 25°, preferably –10 to –15°. As a rule, the negative rake angle is chosen depending on the material of which the given tool is comprised.

It is also particularly advantageous if the bore-milling cutters have a rake angle in the range +3 to –15°, preferably zero to –10°, particularly preferably –5 to –10°. In this way, the wear experienced on the bore-milling cutters is also low.

Further, it is advantageous if the holding shaft is not coated with the hard material coating. In this way, the cost of fabricating the inventive milling tool for thread-milling and boring is reduced.

It is also advantageous if the tool is provided with coolant channels from the holding shaft to and into the milling and front face regions. The supplying of coolant, which expedient is per se known, improves the performance of the inventive milling tool for thread-milling and boring with high-strength workpieces.

The invention also comprises a method of applying the above-described inventive milling tool for thread-milling and boring, wherein the tool, in the course of machining a thread in a workpiece, simultaneously executes: an advance into the workpiece, a circular translational movement, and a rotation; and the direction of the circular translational movement is opposite to the direction of rotation. In other words, the direction of rotation of the tool is opposite to the direction of the circular translational movement, which circular translational movement is dictated by the intended configuration of the thread. Accordingly the process is according to the principle of downcut milling.

The combination of the described method of applying the milling tool for thread-cutting and boring, and the inventive configuration of the tool, results in improved inside thread-milling of high-strength workpieces, in that the advantages of downcut milling are added to the advantages of the inventive configuration. In downcut milling, the milling cut begins at the thicker end of the comma-shaped cutting which is being cut away, and the cut ends at the thinner end of said cutting. This reduces the frictional wear on the thread-milling cutters, and leads to a reduced tendency of the tool to seize. The use of downcut milling in the thread-milling process enables (or facilitates) the thread-milling of high-strength materials. To produce a right-hand thread, the circular translational movement is clockwise and the rotation is counterclockwise, whereas to produce a left-hand thread the circular translational movement is counterclockwise and the rotation is clockwise.

The inventive milling tool for thread-milling and boring may have truncations and the like on its cutting teeth, or not. Preferably, a truncation occurs for approximately one thread loop. For the hard material coating, one may, e.g., apply an intermediate layer (e.g. of titanium nitrite) on the hard metal, which intermediate layer serves as a binder; then only one other layer, a second layer (e.g. of titanium aluminum nitrite, 2–3 micron thick), is applied to the intermediate layer by means of a PVD process.

In the inventive milling tool for thread-milling and boring, as a rule the outer diameter of the lateral cutting region in which the thread-milling teeth are disposed is greater than the outer diameter of the front end region in which the bore-milling cutters are disposed. This relationship between the outer diameters will be the relationship primarily used in practice, with the described tool configuration and method of application. The mode of operation of the inventive tool will always be such that the core opening and threads are produced simultaneously.

BRIEF DESCRIPTION OF THE DRAWINGS

FIG. 1 is a lateral view of a milling tool for thread-milling and boring of high-strength materials;

FIG. 2 is a front-end view of the tool according to FIG. 1;

FIG. 3 is a schematic view of the coordination of the tool according to FIG. 1 with a workpiece;

FIG. 4 is a schematic illustration of the movement of the tool according to FIG. 1 when machining a thread;

FIG. 5 is an illustration of the cutting edge of a thread-milling cutter which has a negative rake angle;

FIG. 6 is an illustration of a bore-milling cutter which has a negative rake angle; and FIG. 7 is a schematic view of thread-milling teeth having a truncation.

DETAILED DESCRIPTION OF THE PREFERRED EMBODIMENTS

The milling tool for thread-milling and boring illustrated has a holding shaft 1 which is held in the chuck of a tool spindle of a milling machine. Forward of the shaft 1 there is a transition region to the cutting region 2 which has four straight grooves 3 for cuttings and four rows of thread-milling teeth 4, wherewith each such row extends in the axial direction, and the rows are mutually separated in the circumferential direction.

The cutting teeth 4 are mutually separated by respective grooves 5, and form respective thread-milling cutters 6. The front end of the tool is tapered in the forward direction, and terminates in a front face 7 which is provided with bore-milling cutters 8 which are configured as front-end bore-milling cutters and then at higher radial distances undergo an angular or rounded transition wherewith at the cylindrical surface they are configured as side cutters which also cooperate in producing the core opening. The thread-milling teeth 4 disposed in rows are all of equal size.

The described tool produces a core opening 9 and a thread 5 (FIG. 3). The tool 14 being rotated around its shaft axis in rotational direction 10 as it is advanced axially (11) into the workpiece 15 while being moved in a circular translational path (13) (FIG. 4), wherewith the advance of the thread-milling cutters 6 is in a helical path 12.

The first region to engage the workpiece is the front face 7. As the tool is advanced deeper the thread-milling teeth 4 engage the workpiece and produce the threads at the same time that they contribute to boring the core opening. The depth of the thread can be adjusted by adjusting the number of circular turns and the axial i rate of advance (which advance depends on the thread pitch). The tool has a coating of hard material 16 over the entire surface of the thread-cutting region 2 and front face region 7, but not over the surface of the holding shaft 1. According to FIG. 5, each thread-milling tooth 4 bears a thread-milling cutter 6 in such a manner that a negative rake angle 17 is provided between a radial line through the cutter and a line tangent to the thread-milling tooth 4 on the forward side of the tooth (the forward side being the side facing the direction of rotation 10) (FIGS. 5 and 2). Also shown (FIG. 5) is the acute angle 18 between the radial line and a line tangent to the rearward side of the thread-milling tooth.

An end cutter 8 is shown in FIG. 6, which cutter is disposed on the front end region 7. Cutter 8 also has a negative rake angle 19. The frontmost thread-milling tooth 4 (tooth nearest the front face 7) in the thread-cutting region 2 has a truncation 20 (FIG. 7).

I claim:

1. Process for thread milling and boring in a work piece, said process comprising:

using a thread milling tool having a receiving shank, a milling area with thread milling cutting-edges on pitch-free thread milling teeth at the periphery and a front area with bore-milling cutting-edges, the areas forming the thread milling and the bore-milling cutting-edges having a hard material coating, the thread milling cutting-edges forming an effective cutting angle, the effective cutting angle of the thread milling cutting-edges being negative and the hard material coating in the areas of the thread milling and bore-milling cutting-edges being a wear-resistant layer applied by physical or chemical vapor deposition with a minimum hardness of 2,500 HV, and the milling area with the thread milling cutting-edges being formed of a single piece throughout, the milling area with the thread milling teeth having an outer diameter and the front area with the bore-milling cutting-edges having an outer diameter, and the outer diameter of the milling area with the thread milling teeth being greater than the outer diameter of the front area with the bore-milling cutting-edges, and making a forward feed motion with the thread milling tool into the work piece with a circular turning and a rotation at the same time when cutting threads in the work piece, in connection with which the circular turning and the rotation on the work piece are in opposite directions.

2. Process according to claim 1, wherein the effective cutting angle of the thread milling cutting-edges is up to minus 25°.

3. Process according to claim 2, wherein the effective cutting angle of the thread milling cutting-edges is minus 10° to minus 15°.

4. Process according to claim 1, wherein the bore-milling cutting-edges have an effective cutting angle of plus 3° to minus 15°.

5. Process according to claim 4, wherein the effective cutting angle of the bore-milling cutting-edges is from 0° to minus 10°.

6. Process according to claim 5, wherein the effective cutting angle of the bore-milling cutting-edges is from minus 5° to minus 10°.

7. Process according to claim 1, wherein the work piece is made of a high-strength material.

* * * * *